United States Patent [19]

Kawate et al.

[11] 4,412,090
[45] Oct. 25, 1983

[54] THERMAL SENSOR FOR DETECTING TEMPERATURE DISTRIBUTION

[75] Inventors: Yoshio Kawate, Toyonaka; Nobuyuki Nagai, Kobe; Takefumi Horiuchi, Kobe; Teruhisa Uehara, Kobe; Susumu Hachiya, Miki, all of Japan

[73] Assignee: Kabushiki Kaisha Kobe Seiko Sho, Kobe, Japan

[21] Appl. No.: 318,401

[22] Filed: Nov. 5, 1981

[30] Foreign Application Priority Data

Nov. 7, 1980 [JP] Japan ............... 55-159782[U]

[51] Int. Cl.³ .................................. H01L 35/02
[52] U.S. Cl. ........................... 136/230; 73/86; 374/7; 374/137
[58] Field of Search ............ 73/86; 136/221, 230; 374/7, 137

[56] References Cited

U.S. PATENT DOCUMENTS

| | | | |
|---|---|---|---|
| 2,779,810 | 1/1957 | Horbinski | 136/221 |
| 3,018,663 | 1/1962 | Dunlop | 73/341 |
| 3,637,438 | 1/1972 | Springfield | 136/230 |
| 3,939,012 | 2/1976 | Williams | 136/221 |
| 4,028,139 | 6/1977 | Smith et al. | 136/230 |
| 4,204,882 | 5/1980 | Howell | 136/221 |
| 4,358,953 | 11/1982 | Horiuchi et al. | 73/86 X |

*Primary Examiner*—Leland A. Sebastian
*Attorney, Agent, or Firm*—Oblon, Fisher, Spivak, McClelland & Maier

[57] ABSTRACT

A thermal sensor for detecting temperature distribution in a deposit layer on the refractory walls of a blast furnace or the like, including a temperature probe assembly having temperature sensing areas at different points along the length thereof, an outer protective casing for accommodating the probe assembly, a number of annular fin members fitted on the temperature sensing areas of the probe assembly and secured to the outer protective casing, and an insulating material filled between the outer protective casing and the probe assembly for thermally insulating the fine members from each other.

4 Claims, 3 Drawing Figures

THERMAL SENSOR FOR DETECTING TEMPERATURE DISTRIBUTION

BACKGROUND OF THE INVENTION

1. Field of the Invention

This invention relates to a thermal sensor for detecting temperature distributions, and more particularly to a sensor which is capable of continuously detecting the temperature distribution in a deposit layer on the refractory wall of a furnace with high precision, along with the temperature distribution in the refractory wall itself.

2. Description of the Prior Art

A layer of deposits is apt to be formed on the refractory walls of a blast furnace, particularly, on the refractory wall of a shaft furnace which is cooled through a cooling box. Once formed, such a deposit layer keeps growing in thickness during operation of the furnaces and destabilizes the furnace operation to a considerable degree not only by reducing the capacity of the furnace but also by ununiformalizing the gravitation of the loaded material as well the gas flows in the furnace.

In order to prevent the formation and growth of such deposit layer, it has been the general practice to measure the thickness of the deposit layer by inserting elongated scales through a number of bores in the furnace wall while the blasts are stopped and removing the deposit layer by detonating explosives when it has grown to a certain extent. The use of explosives incurs a large expense for the removing job which only may be in vain in view of the resulting damage to the furnace walls and the danger involved in the job.

However, once the deposit layer has grown to some extent, there has been no method but the above-mentioned method which could remove the deposit layer although it is hazardous to the stable operation of the blast furnace. More particularly, from the stand-point of safe operation, it is desired that the deposits be removed as promptly as possible and in a safe and facilitated manner. For this purpose, the formation of the deposit layer and its condition growth should be kept under observation so that it can be removed by a mechanism before it developes into a substantial thickness, without resorting to explosives.

In view of the difficulty of observing the formation and growth of the deposit layer directly with the naked eye, it may occur to those skilled in the art to provide a sensor projecting from the refractory walls of the furnace, letting the deposit layer grow also on the sensor for judging the condition of the deposit layer on the basis of the information from the sensor. However, no sensors have been developed which have a sufficiently high response and sensitivity in temperature measurement for realizing such a method.

SUMMARY OF THE INVENTION

With the foregoing in view, the present invention has as its object the provision for a thermal sensor for continuously detecting the temperature distribution in a deposit layer on the refractory wall of a furnace with high precision.

According to the present invention, there is provided a thermal sensor which includes a temperature probe assembly having within a sheath type enclosure a plurality of juxtaposed sheath type thermocouples or sheath type resistance thermometers with respective temperature sensing areas located at different points along the length of the probe assembly, elements of the same material as the sheath type thermocouples or resistance thermometers being connected to the tips of the respective temperature sensing areas, and an insulating filler material disposed in the sheath type enclosure to keep the thermocouples or thermometers out of contact with each other; and outer protective casing with high heat resistance and strength accommodating therein said probe assembly; annular fin members fitted on the temperature sensing areas of the probe assembly and fixed to the outer protective casing; and a heat-insulating filler material disposed between the outer protective casing and the sheath type enclosure of the probe assembly to insulate the fin members from each other.

A temperature probe assembly of the construction as mentioned above is described in our prior Japanese Utility Model publication No. Sho 55-105140, published July 22, 1980, directed to "a temperature probe assembly for the detection of temperature distribution." The application (Japanese Utility Model Application No. Sho 54-4855, filed Jan. 17, 1979) which matured into that publication was the basis of U.S. application Ser. No. 183,452, filed Sept. 2, 1980, now U.S. Pat. No. 4,358,953, issued Nov. 16, 1982. Therefore, details in construction of the probe assembly are not discussed in this specification.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF PREFERRED EMBODIMENT

Figure 1:
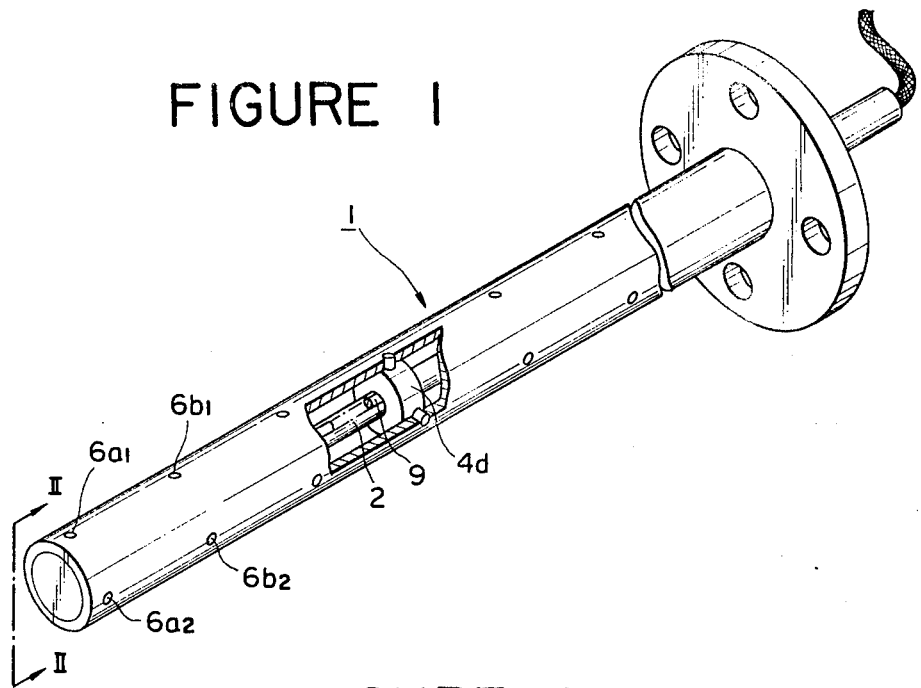
FIG. 1 is a partly cut-away perspective view of a thermal sensor according to the present invention, in which insulating filler material is omitted for the convenience of illustration.
Figure 2:
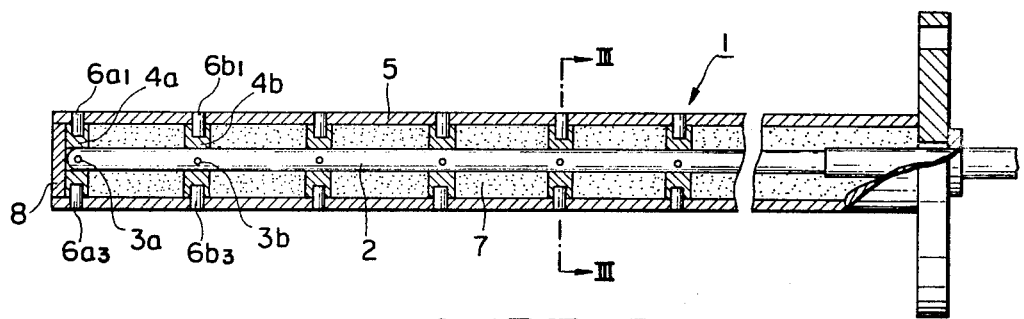
FIG. 2 is a longitudinal sectional view of the thermal sensor taken along line II—II of FIG. 1.
Figure 3:
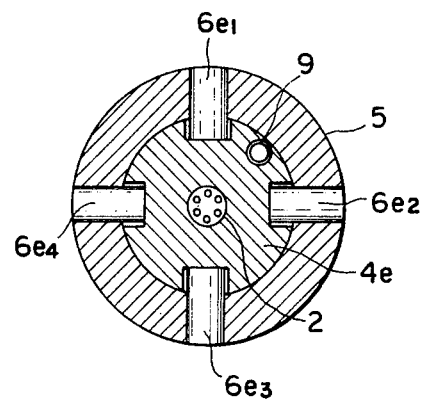
FIG. 3 is a cross sectional view taken along line III—III of FIG. 2.

Referring to FIGS. 1 to 3, designated at reference number 2 is a temperature probe for the detection of temperature distribution (hereinafter referred to simply as "probe assembly"). The thermal sensor includes a number of annular disc-like fins $4a$, $4b$ . . . which are fitted around temperature sensing points $3a$, $3b$ . . . which are provided at suitable intervals along the length of the probe assembly. Fin member $4a$, $4b$ . . . are fixed to a tubular outer protective casing 5 through positioning members $6a1$, $6a2$, $6a3$, $6a4$, $6b1$, $6b2$ . . . The provision of the disc-like fin members $4a$, $4b$ . . . enhances the sensitivity in thermal response of the probe. In this connection, of course the temperature probe (particularly the temperature sensing points $3a$, $3b$ . . . ), the disc-like fin members $4a$, $4b$ . . . and the outer protective casing 5 should be held so as to have good thermal contact with each other.

The compartments which are partitioned by the fin members $4a$, $4b$ . . . between the probe assembly 2 and outer protective casing 5 are filled with an insulating material 7 to ensure the endurance of the probe assembly and shut off the heat dissipation in the longitudinal direction of the sensor, thereby enhancing the accuracy of the temperature measurement. Insulating material 7 should be suitably a refractory material like MgO powder.

The fore end of the protective casing 5 which is exposed to the furnace is closed by a blind plate 8 to shut off the furnace gases and to prevent deterioration of the sensor 1, thereby maintaining the stability of the temperature measurement over a long time period.

If desired, a supervisory pipe 9 may be provided between and parallel with the probe assembly 2 and outer protective casing 5 through disc-like fin members 4a, 4b... thereby checking for the degree of bending of the sensor 1 or the degree of deterioration of the output temperature signals during use over a long time period. In addition, the supervisory pipe 9 facilitates maintenance and servicing of the sensor 1.

The thermal sensor 1 with the above-described construction according to the invention has a remarkably improved response sensitivity in temperature measurement due to the provision of the fin members 4a, 4b which are located so as to surround the respective temperature sensing points of the probe assembly and thermally insulated from each other by the filter material. Since a material of high heat resistance and strength is used for the outer protective 5 casing, the sensor can sufficiently withstand the high temperatures and the weight of the loaded material of the furnace and a continued use over a long period of time. Further, the supervisory pipe which is provided integrally in the sensor 1 detects bending of even a slight degree or deterioration in the measured temperature output which might occur to the sensor when used continually over a long time period, facilitating the maintenance and service of the sensor. It follows that the deposit layer can be removed from the refractory walls of furnace safely and easily when it is still in the early stage of growth, to maintain stable operation of the blast furnace.

The thermal sensor according to the present invention serves as a means for studying the mechanisms of formation and growth of the deposit layer in a blast furnace and provides data which can be used for the development of a novel method to suppress the formation and growth of the deposit layer during operation of a blast furnace.

Although the invention has been described and shown by way of one preferred embodiment, it is to be understood that various alterations or modifications can be made thereto without departing from the scope of the invention as defined in the appended claims.

What is claimed as new and desired to be secured by Letters Patent of the United States is:

1. A thermal sensor comprising:
   (a) an outer protective casing extending along a linear axis;
   (b) a plurality of juxtaposed temperature sensing devices disposed within said outer protective casing and extending along the linear axis thereof, said plurality of juxtaposed temperature sensing devices having their respective temperature sensing areas located at spaced intervals;
   (c) a plurality of annular disc-like fins disposed within said outer protective casing and extending from said plurality of juxtaposed temperature sensing devices to said outer protective casing, each of said plurality of annular disc-like fins being in good thermal contact both with one of said temperature sensing areas of said plurality of juxtaposed temperature sensing devices and with said outer protective casing; and
   (d) insulating filler material disposed within said outer protective casing in between said annular disc-like fins to ensure the endurance of said temperature sensing devices and to deter heat transfer along the linear axis of the thermal sensor, thereby enhancing the accuracy of the temperature measurement.

2. A thermal sensor as recited in claim 1 and further comprising positioning members which fix said annular disc-like fins to said outer protective casing.

3. A thermal sensor as recited in claim 2 wherein said positioning members are dowels which protrude through said outer protective casing and into said annular disc-like fins.

4. A thermal sensor as recited in claim 1 and further comprising a supervisory pipe means disposed within said outer protective casing and extending through said annular disc-like fins for detection of bending of or deterioration in the sensitivity of the thermal sensor.

* * * * *